United States Patent
Saikatsu et al.

(10) Patent No.: US 6,299,676 B1
(45) Date of Patent: *Oct. 9, 2001

(54) PIGMENT DISPERSANTS, PIGMENT DISPERSIONS AND WRITING OR RECORDING PIGMENT INKS

(75) Inventors: Hiroaki Saikatsu; Hisao Okamoto; Shigeru Sakamoto; Mitsuo Yamazaki; Tetsuo Fukuda; Shiro Yamamiya; Yoshio Abe; Michiei Nakamura, all of Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/468,303

(22) Filed: Dec. 21, 1999

(30) Foreign Application Priority Data

Dec. 28, 1998 (JP) .................................. 10-371915

(51) Int. Cl.⁷ ......................... C07D 251/00; C09D 11/00
(52) U.S. Cl. ...................... 106/31.77; 106/498; 524/100; 544/187; 544/188
(58) Field of Search ..................... 106/498, 31.77; 430/7, 322; 544/187, 188; 524/100

(56) References Cited

U.S. PATENT DOCUMENTS

| | | | |
|---|---|---|---|
| 3,262,933 | * 7/1966 | Mix et al. | 544/187 |
| 3,282,940 | * 11/1966 | Weber et al. | 544/187 |
| 3,297,695 | * 1/1967 | Weidinger et al. | 544/187 |
| 3,300,491 | * 1/1967 | Jenny et al. | 544/187 |
| 3,349,089 | * 10/1967 | Kazaankov et al. | 544/187 |
| 3,470,178 | * 9/1969 | Neef et al. | 544/187 |
| 3,488,349 | * 1/1970 | Neef | 544/187 |
| 3,684,808 | * 8/1972 | Ulrich | 544/187 |
| 4,098,793 | * 7/1978 | Ribaldone et al. | 548/134 |
| 4,442,287 | * 4/1984 | Hartwig et al. | 544/187 |
| 5,368,976 | * 11/1994 | Tajima et al. | 430/176 |
| 5,731,110 | * 3/1998 | Hishiro et al. | 430/7 |
| 5,811,219 | * 9/1998 | No et al. | 430/287.1 |
| 5,827,626 | * 10/1998 | Kobayashi et al. | 430/7 |
| 5,853,924 | * 12/1998 | Uwami et al. | 430/7 |
| 5,863,678 | * 1/1999 | Urano et al. | 430/7 |
| 5,961,711 | 10/1999 | Saikatsu et al. | 106/498 |

* cited by examiner

Primary Examiner—Anthony J. Green
(74) Attorney, Agent, or Firm—Oblon, Spivak, McClelland, Maier & Neustadt, P.C.

(57) ABSTRACT

Dispersants for organic pigments comprise compounds represented by the following formula (I):

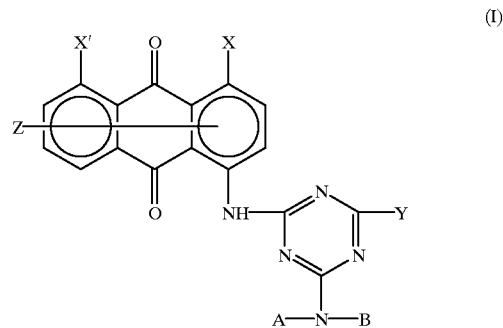

wherein X and X' each independently represent H, OH, alkoxy, primary, secondary or tertiary amino, or acylamino; Y represents an anthraquinonylamino, phenylamino or phenoxy group having H, OH, alkoxy, primary, secondary or tertiary amino, or acylamino at the 4-position or 5-position; A and B each independently represent alkyl, cycloalkyl or aryl, and at least one of A and B has at least one substituent group containing a basic nitrogen atom; and Z represents H, CN, halogen, alkyl, alkoxy, $NO_2$, benzoylamino or 3-benzoyl, and the 3-benzoyl group may be fused together with X to form an acridone ring. Pigment dispersions making use of the above dispersants are suited for the production of writing or recording pigment inks.

15 Claims, No Drawings

PIGMENT DISPERSANTS, PIGMENT DISPERSIONS AND WRITING OR RECORDING PIGMENT INKS

BACKGROUND OF THE INVENTION a) Field of the Invention

This invention relates to dispersants for organic pigments (hereinafter simply referred to as "pigments"), pigment dispersions and writing or recording pigment inks, and more specifically to pigment dispersants and also to pigment dispersions making use of the pigment dispersants, having excellent fluidity, dispersion stability, storage stability and the like and suited especially for the production of writing or recording pigment inks.

b) Description of the Related Art

Marking inks for use in writing instruments, which make use of bundled fiber tips or felt tips, have conventionally been made of resins, pigments and solvents, and as the pigments, dyes have been employed. As the solvents, ester or aromatic solvents have been used from the standpoint of solubility for the resins and also solubility for the dyes.

It is however desired to avoid use of aromatic solvents, because they give deleterious effects on the health of workers (organic solvent intoxication) and they themselves are air pollutants. Although there is a move toward water-based writing inks, solvent-based maker pens are still employed widely. This can be attributed to the excellent writing performance of solvent-based inks on plastic films such as polyethylene films and also to the superb drying characteristics of the solvent-based inks shortly after written on plastic films.

Ink-jet printing, on the other hand, is a digital printing controlled by a computer. Printing information signals are supplied to a printer directly from the computer, so that no plate-making is needed. Ink-jet printing is therefore suited particularly for the printing of various images in small numbers of copies, and recent advancements in ink-jet printers have made it possible to perform printing of a variety of highly-detailed large images.

Ink-jet printing inks are required to have low viscosity and excellent stability. There are organic-solvent-based inks making use of dyes, but as pigment-type inks, water-based inks are used because ink-jet printing inks making use of pigments involve technical difficulties. However, water-based inks contain, as vehicles, resins at extremely low concentrations so that good color developments are not available. Water-based inks are also accompanied by a problem of adhesion to plastic films. Under these circumstances, there is a strong desire for the development of alcohol-based ink-jet printing inks making use of pigments and assuring good color developments.

Incidentally, as is observed from paints and the like, the conventional technology expects much on the dispersing power of a resin for a pigment upon dispersing the pigment on a resin solution. When the dispersing power of the resin is insufficient for the pigment, a pigment dispersant (pigment treatment) (hereinafter simply referred to as "a pigment dispersant) has been employed. in general paints, sufficient dispersion of pigments is feasible with conventional dispersants.

Compared with paints, however, writing or recording pigment inks are required to have extremely low viscosity and in addition, to have an extremely high degree of dispersion of pigments. Despite these requirements, use of conventional resins and dispersants is unable to achieve sufficient dispersion of pigments or leads to changes in the viscosity of pigment dispersions along the passage of time due to desorption of the dispersant from the pigments and insufficient compatibility between the pigments and the resins, thereby making it extremely difficult to obtain pigment dispersions which meet the property and performance requirements.

If an alcoholic solvent such as ethanol can be used as a solvent in an organic-solvent-based pigment ink, deleterious effects on the health of users of writing instruments and people studying or working in the same environment as the users can be reduced, the problem of air pollution can be lessened owing to the avoidance of an organic solvent, and further, the problems of drying characteristics and wetting to plastic films, said problems being inherent to water-based inks, can also be eliminated. Moverover, alcoholic solvents are resources reproducible in the natural world so that use of such solvents is preferred. Nonetheless, with resins soluble in conventionally-known alcoholic solvents, it is still extremely difficult to obtain pigment inks satisfactory in the requirements for low viscosity, high dispersion and high dispersion stability even if dispersants are used.

SUMMARY OF THE INVENTION

An object of the present invention is therefore to provide a dispersant which is excellent in the dispersibility of pigments and permits production of a pigment dispersion excellent in the stability of viscosity. Another object of the present invention is to provide a pigment dispersion, writing ink or recording ink, which is using a pigment as a coloring matter, contains a resin—which is soluble in an organic solvent, especially an alcoholic solvent—in a sufficient. amount relative to the pigment, has a low viscosity, good pigment dispersibility and excellent viscosity stability, and gives less deleterious effects on the health of a user of a writing instrument or recording apparatus and people studying or working in the same environment as the user.

To achieve the above-described objects, the present invention provides an dispersant for organic pigments, comprising a compound represented by the following formula (I):

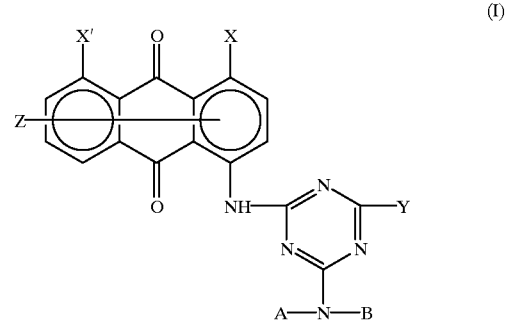

wherein X and X' each independently represent a hydrogen atom, a hydroxyl group, an alkoxy group, a primary, secondary or tertiary amino group, or an acylamino group; Y represents an anthraquinonylamino, phenylamino or phenoxy group having a hydrogen atom, a hydroxyl group, an alkoxy group, a primary, secondary or tertiary amino group, or an acylamino group at the 4-position or 5-position thereof; A and B each independently represent an alkyl group, a cycloalkyl group or an aryl group, and at least one of A and B has at least one substituent group containing a basic nitrogen atom; and Z represents a hydrogen atom, a cyano group, a halogen atom, an alkyl group, an alkoxy group, a nitro group, a benzoylamino group or a 3-benzoyl group, and the 3-benzoyl group may be fused together with X to form an acridone ring; a pigment dispersion comprising an organic pigment, a dispersant, a film-forming resin and an organic solvent, wherein the dispersant is the above-described dispersant; a writing or recording pigment ink comprising the dispersion; and a writing instrument or recording apparatus comprising the ink (the pigment dispersion and the writing ink or recording ink will hereinafter be collectively called "the ink").

The term "at least one substituent group containing a basic nitrogen atom" as used herein may mean a primary, secondary or tertiary amino group, a quaternary ammonium group or a pyridinium group, with a tertiary amino group being particularly preferred.

The dispersant according to the present invention is useful as a dispersant for a variety of conventionally-known pigments, especially as a dispersant for various pigments used as coloring matters in inks, various paints, various printing inks, various, pigment printing agents and synthetic resins. In particular, use of the dispersant according to the present invention by adding it as a dispersant to red, green yellow and purple inks makes it possible to stably produce low-viscosity inks and eventually to obtain excellent inks.

DETAILED DESCRIPTION OF THE INVENTION AND PREFERRED EMBODIMENTS

The present invention will hereinafter be described in further detail based on certain preferred embodiments. Dispersants according to the present invention are useful as dispersants for a variety of conventionally-known pigments used as coloring matters in various paints, various printing inks, various pigment printing agents and synthetic resins. An especially useful application is an application as dispersants for pigments in inks. Accordingly, the present invention will hereinafter be described by taking inks as representative examples.

The dispersants according to the present invention can be prepared by the preparation process disclosed, for example, in JP 46-33232 B, JP 46-33233 B, or JP 4-34518 B, or a process similar to the preparation process. As an example, a dispersant can be obtained by reacting 1 mole of 1-amino-5-benzoylaminoanthraquinone, 1 mole of aniline or phenol and 1 mole of cyanuric chloride at 130 to 160° C. for 2 to 6 hours in an inert solvent such as o-dichlorobenzene, adding 1 mole of a polyamine containing at least one secondary amino group and at least one tertiary amino group and containing no primary amino group, and then reacting them at 150 to 170° C. for 3 to 4 hours.

Illustrative of the "polyamine containing at least one secondary amino group and at least one tertiary amino group and containing no primary amino group" employed in the above-described process are:
N,N,N'-trimethyl-ethylenediamine,
N,N-dimethyl-N'-ethyl-ethylenediamine,
N,N-diethyl-N'-methyl-ethylenediamine,
N,N-dimethyl-N'-ethyl-propylenediamine,
N,N,N'-trimethyl-propylenediamine,
N,N,N'-triethyl-propylenediamine,
N,N,N'-trimethyl-hexamethylenediamine,
N,N-diethyl-N'-methyl-p-phenylenediamine,
N,N-dipropyl-N'-methyl-p-phenylenediamine,
N,N,N'-trimethyl-p-phenylenediamine,
N,N,N'-trimethyl-m-phenylenediamine,
N,N,N'-triethyl-p-phenylenediamine,
N,N-diethyl-N'-methyl-1,4-diaminocyclohexane,
N,N-diethyl-N'-methyl-1,3-diaminocyclohexane,
N,N,N'-trimethyl-1,4-diaminocyclohexane,
N,N,N'-triethyl-1,4-diaminocyclohexane,
N-methylpiperazine,
N-ethylpiperazine,
N-isobutylpiperazine,
2-chlorophenylpiperazine,
N-(2-pyridyl)piperazine,
N-(4-pyridyl)piperazine, and
Methylhomopiperazine.

In addition to the above-described compounds, particularly preferred can include:
N,N,N'',N''-tetramethyldiethylenetriamine,
N,N,N'',N''-tetra(n-propyl)diethylenetriamine,
N,N,N'',N''-tetra(i-propyl)diethylenetriamine,
N,N,N'',N''-tetra(n-butyl)diethylenetriamine,
N,N,N'',N''-tetra(i-butyl)diethylenetriamine,
N,N,N'',N''-tetra(s-butyl)diethylenetriamine,
N,N,N'',N''-tetra(t-butyl)diethylenetriamine,
3,3'-iminobis(N,N-dimethylpropylamine),
3,3'-iminobis(N,N-diethylpropylamine),
3,3'-iminobis[N,N-di(n-propyl)propylamine],
3,3'-iminobis[N,N-di(i-propyl)propylamine],
3,3'-iminobis[N,N-di(n-butyl)propylamine],
3,3'-iminobis[N,N-di(i-butyl)propylamine],
3,3'-iminobis[N,N-di(s-butyl)propylamine],
3,3'-iminobis[N,N-di(t-butyl)propylamine],
4,4'-iminobis(N,N-dimethylbutylamine),
4,4'-iminobis(N,N-diethylbutylamine),
2,9-dimethyl-2,5,9-triazadecane,
2,12-dimethyl-2,6,12-triazatridecane,
2,12-dimethyl-2,5,12-triazatridecane,
2,16-dimethyl-2,9,16-triazaheptadecane,
3-ethyl-10-methyl-3,6,10-triazaundecane,
5,13-di(n-butyl)-5,9,13-triazaheptadecane,
2,2'-dipicolylamine, and
3,3'-dipicolylamine.

Among the dispersants according to the present invention available by the above-described processes, preferred dispersants are compounds represented by the following formula (1), more preferred dispersants are compounds represented by the formula (2), and particularly preferred dispersants are compounds represented by the following formula (3):

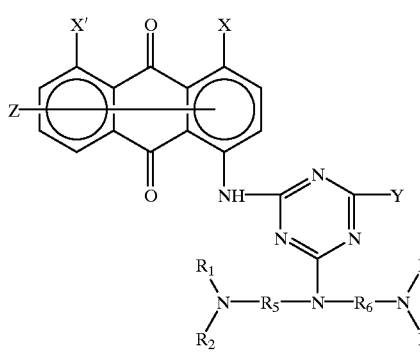

(1)

wherein X, X', Y and Z have the same meanings as defined above; $R_1$ to $R_4$ may be the same or different and each independently represent a substituted or unsubstituted alkyl or cycloalkyl group, and $R_1$ and $R_2$ and/or $R_3$ and $R_4$ may be fused together with the adjacent nitrogen atom thereof to form a heterocyclic ring which may additionally contain a further nitrogen atom, an oxygen atom or a sulfur atom; and $R_5$ and $R_6$ each independently represent an alkylene group, a cycloalkylene group or an arylene group.

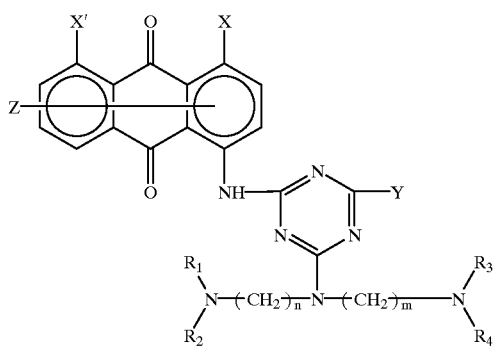

(2)

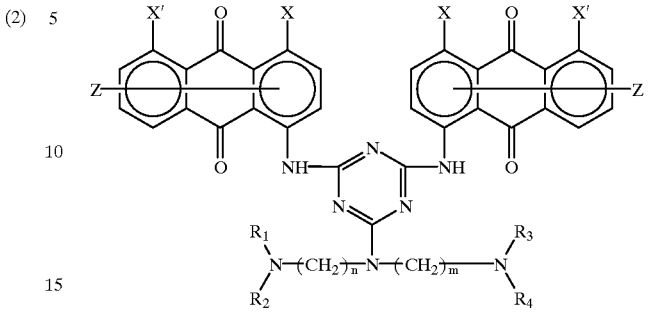

(3)

wherein X, X', Y, Z and $R_1$ to $R_4$ have the same meanings as defined above; and n and m each independently stand for an integer of from 2 to 30.

Incidentally, the aminoacyl groups in the above-described formula (I) and the above-described formulas (1) to (2), are groups represented by —NHCOR, in which R is a phenyl group, a methyl group, an ethyl group, a propyl group, a butyl group, or the like.

wherein X and X' each independently represent a hydrogen atom or a benzoylamino group; Z represents a hydrogen atom; $R_1$ to $R_4$ may be the same or different and each independently represent a methyl group or an ethyl group; and n and m each independently stand for 2 or 3.

Specific examples of preferred dispersants in the present invention can include, but are not limited to, the followings in which X represents a benzoylamino group:

Specific Example 1

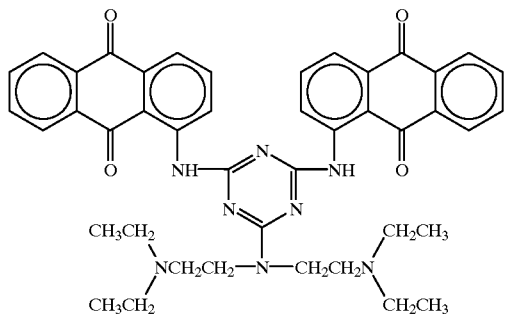

Specific Example 2

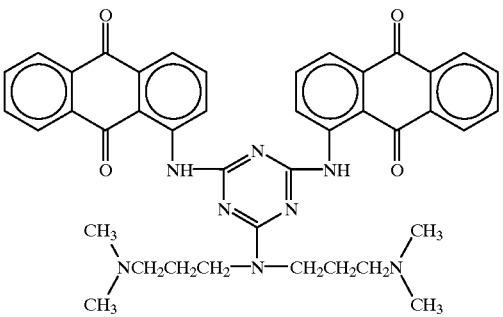

Specific Example 3

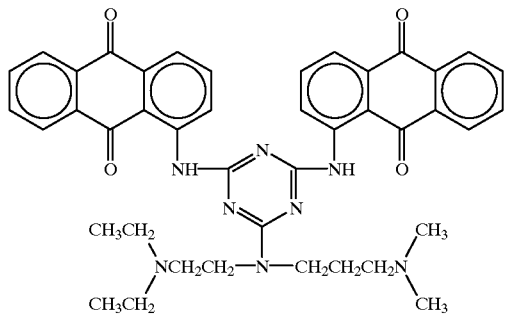

Specific Example 4

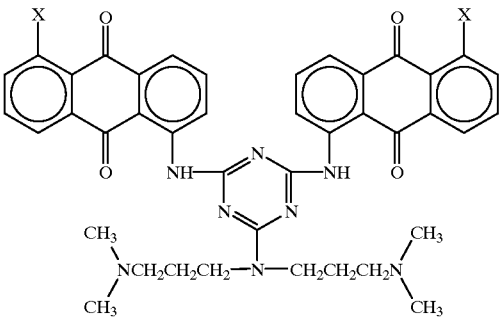

-continued
Specific Example 5
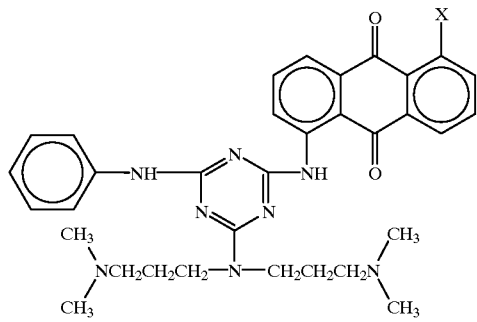
Specific Example 6
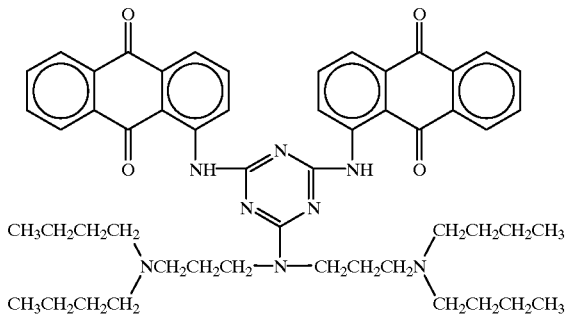
Specific Example 7
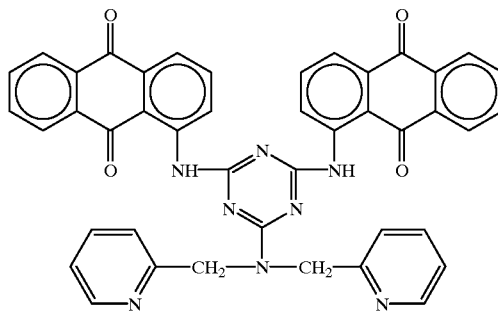
Specific Example 8
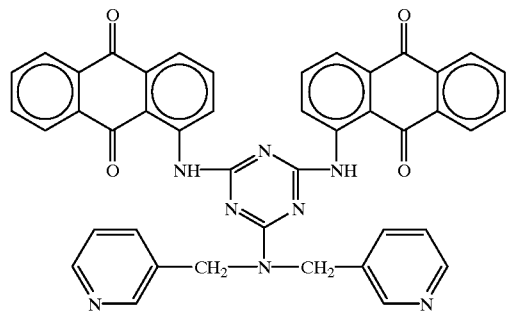
Specific Example 9
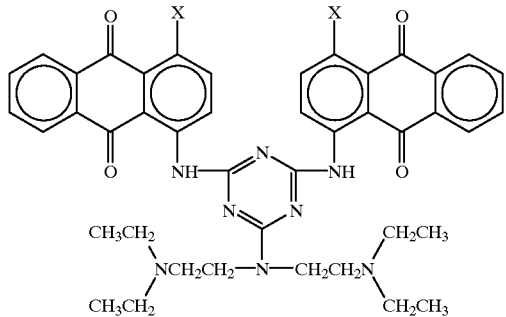
Specific Example 10
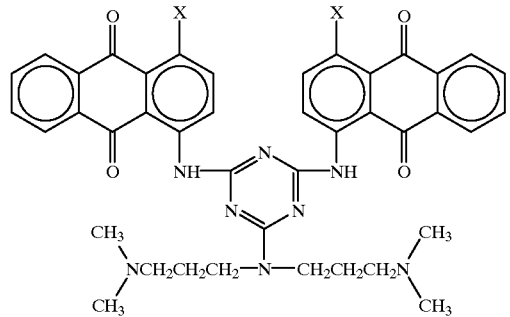
Specific Example 11
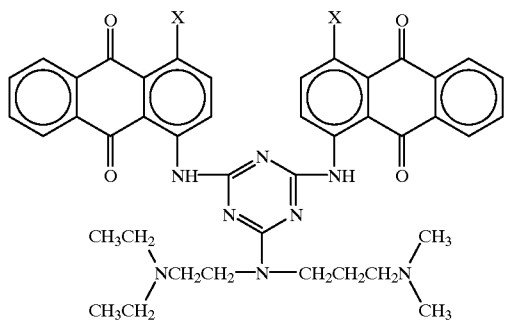
Specific Example 12
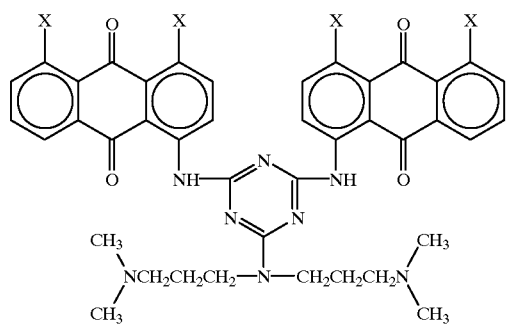

-continued

Specific Example 13

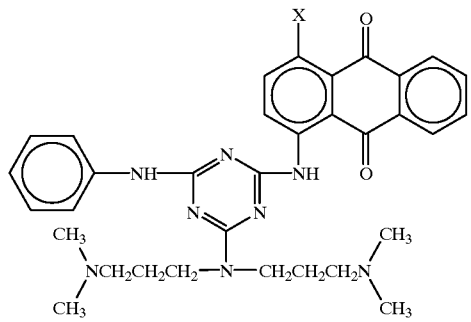

Specific Example 14

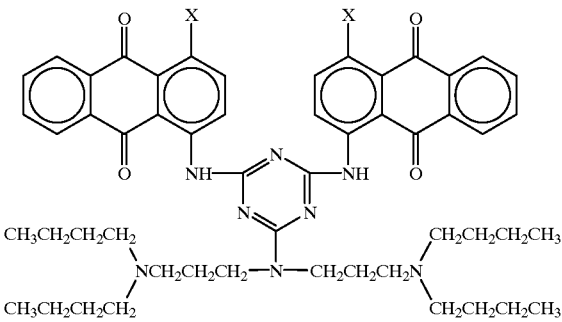

Specific Example 15

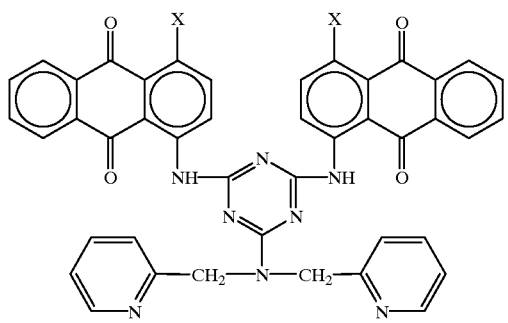

Specific Example 16

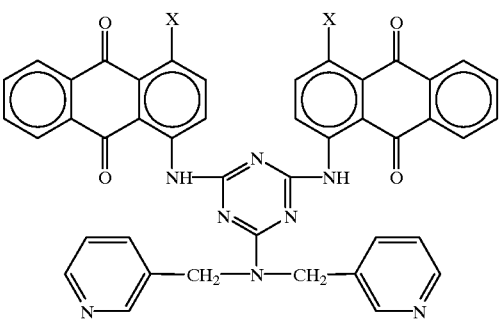

Specific Example 17

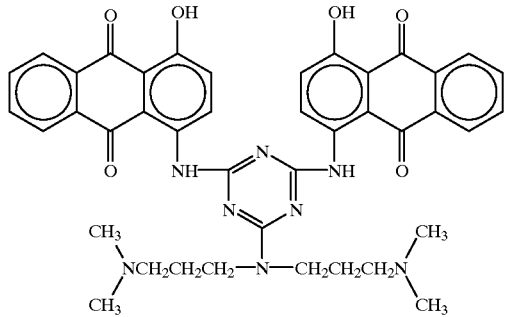

Specific Example 18

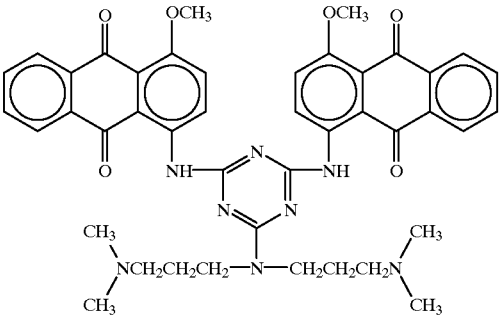

Specific Example 19

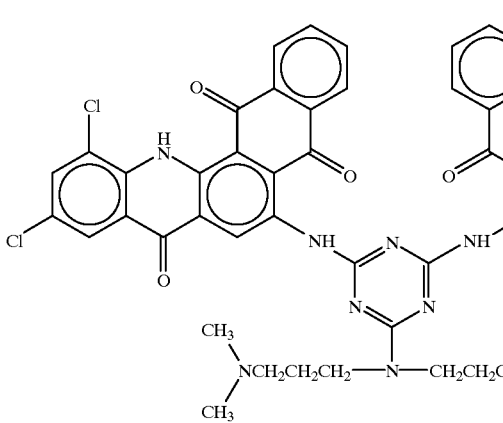

and the quaternary ammonium compounds of Specific Examples 1–6, 9–14 and 17–19 and the pyridinium compounds of Specific Examples 7–8 and 15–16.

Inks according to the present invention are formed of the above-described dispersants, pigments, film-forming resins and organic solvents. Conventionally-known pigments are all usable as pigments in the present invention. For example, pigments such as azo pigments, condensed azo pigments, anthraquinone pigments, perylene/perinone pigments, indigothioindigo pigments, isoindolinone pigments, azomethine pigments, azomethineazo pigments, quinacridone pigments, phthalocyanine blue, dioxazine violet, aniline black and carbon black can be used. Particularly preferred pigments can include C.I. pigment red (hereinafter abbreviated as "P.R.") 177, P.R. 254, P.R. 242, C.I. pigment green (hereinafter abbreviated as "P.G.") 36, C.I. pigment blue (hereinafter abbreviated as "P.B.") 15:2, P.B. 15:6, P.B. 60, C.I. pigment yellow (hereinafter abbreviated as "P.Y.") 138, P.Y. 185, P.Y. 150, P.Y. 139, C.I. pigment violet 23, C.I. pigment black (hereinafter abbreviated as "P.BL." 6, P.BL. 7.

Conventionally-known organic solvents employed in various paints, coating formulations, printing inks and the like are all usable as organic solvents in the present invention. When using inks according to the present invention as inks for writing instruments or recording apparatuses, use of alcoholic solvents is preferred. As alcoholic solvents, solvents containing alcohols the boiling points of which are 150° C. or lower are preferred. Alcohols amount to at least 10 wt. %, preferably to 50 to 100 wt. % of alcoholic solvents.

Preferred examples of alcohols can include ethanol, propanol, methoxypropanol, ethoxypropanol, and propyloxyethanol. They can be used either singly or in combination. Solvents other than these alcohols can also be used to extents not contrary to the spirit of the present invention. For example, ethyl acetate, propyl acetate, cyclohexane, methylcyclohexane, ethyl-cyclohexane, methyl ethyl ketone, methyl propyl ketone and the like can be used in combination.

The film-forming resin (hereinafter simply referred to as a "resin") employed in the present invention is required to be soluble in the above-described organic solvent, especially the alcoholic solvent described above. Such a resin comprises, as constituent monomers, an addition-polymerizing monomer containing a carboxyl group, a hydroxyl group or an amido group and a monomer addition-polymerizable with the addition-polymerizing monomer. A description will hereinafter be made about the monomers which make up the resin for use in the present invention.

Examples of the carboxyl-containing monomer can include acrylic acid and methacrylic acid; fumaric acid, maleic acid, itaconic acid, alkyl monoesters thereof, and hydroxyalkyl monoesters thereof; and monoesters between hydroxyalkyl (meth)acrylates, such as hydroxyethyl (meth)acrylate and hydroxypropyl (meth)acrylate, and dibasic acids, for example, succinic anhydride, phthalic anhydride and cyclohexanedicarboxylic acid anhydride. Incidentally, acrylic acid and methacrylic acid will be called (meth) acrylic acid in the present invention.

Examples of the hydroxyl-containing monomer can include hydroxyalkyl (meth)acrylates, for example, hydroxyethyl (meth)acrylate and hydropropyl (meth) acrylate; esters of monoesters between the above-described hydroxyalkyl (meth)acrylates and dibasic acids with dihydroxyalkyl compounds, for example, monoesters of monoesters between hydroxyethyl (meth)acrylate and hydroxypropyl (meth)acrylate and succinic acid, phthalic acid and cyclohexanecarboxylic acid with dihydroxyalkyl compounds such as ethylene glycol and propylene glycol. The carbon numbers of the alkyl groups in the above-described carboxyl- and hydroxyl-containing monomers range from about 1 to 12.

Examples of the amido-containing monomer can include (meth)acrylamides and N-substituted (meth)acrylamides, for example, (meth)acrylic butoxymethylamide, N-tert-butylacrylamide, N-tert-butylmethacrylamide, diacetoneacrylamide, N-isopropylacrylamide, N,N-dimethylacrylamide, N,N-diethylacrylamide, N-methylol-(meth)acrylamide, and N-alkyloxyethyl(meth)acrylamide.

In addition to the above-described monomers, addition-polymerizing monomers copolymerizable with the above-described respective monomers can be used to extents soluble in the alcoholic solvent in order to impart waterproofness, flexibility and/or other physical properties to the resin. Examples of such monomers can include (meth)acrylate esters, for example, methyl (meth)acrylate, ethyl (meth)acrylate, propyl (meth)acrylate, butyl (meth) acrylate, octyl (meth)acrylate, lauryl (meth)acrylate, stearyl (meth)acrylate, cyclohexyl (meth)acrylate, benzyl (meth) acrylate, isobornyl (meth)acrylate, and tetrafulfuryl (meth) acrylate; styrene and styrene derivatives, for example, α-methylstyrene; dialkyl esters of dibasic acids, for example, dialkyl maleates, dialkyl fumarates, and dialkyl itaconates; and vinyl acetate, and (meth)acrylonitrile.

The resin for use in the present invention can be obtained by using the above-described monomers and copolymerizing them, for example, by suspension polymerization or solution polymerization, which uses an alcoholic solvent, in the presence or absence of a conventionally-known radical polymerization initiator. As a resin for use in the present invention, it is preferred to use a resin in which a monomer between an alkyl (meth)acrylate and a dibasic acid—said monomer being represented by the following formula: $CH_2=C(R^1)$—COO—$R^2$—O—CO—$R^3$—COOH in which $R^1$ represents a hydrogen atom or a methyl group, $R^2$ represents an alkylene chain which contains 2 to 6 carbon atoms and may contain a branched chain, $R^3$ represents an alkylene group which may contain a branched chain or unsaturated group—is copolymerized at least a part of a copolymer. A blend of the copolymer with a copolymer free of the above-described specific monomers may also be used. Whichever resin is used, it is preferred to contain units of a monoester monomer between hydroxyalkyl (meth)acrylate and a dibasic acid in a proportion of from 1 to 50 wt. %, preferably from 3 to 40 wt. % based on the whole resin. If the content of the monomer units is too low, the resin is not very effective for dispersing pigments. If the content of the monomer units is too high, on the other hand, writing matter or printed matter has lowered alkali resistance. It is therefore not preferred to contain the monomer units outside the above range.

To obtain the resin by copolymerizing a mixture of the above-described monomers, the monoester of the hydroxyalkyl (meth)acrylate and the dibasic acid may account preferably for 1 to 50 wt. %, more preferably for 3 to 40 wt. % of the monomer mixture. The proportion(s) of other monomer(s) can be suitably determined such that the resulting resin is soluble in the alcoholic solvent and can satisfy its performance requirements, and no particular limitation is imposed on their proportions. The number average molecular weight of the resin (the number average molecular weight as obtained by measuring the resin by GPC and converting the data with reference to the corresponding data of standard polystyrene) ranges generally from 2,000 to 100,000, preferably from 2,000 to 50,000. The acid value of the resin ranges generally from 0.5 to 300 mgKOH/g, preferably from 5 to 180 mgKOH/mg.

The ink according to the present invention can be produced in a similar manner as in the production of conventional inks and paints by using the above-described pigment, dispersant, film-forming resin and organic solvent, and no particular limitation is imposed on the production method itself. Illustrative productions methods can include a method in which the pigment, subsequent to its advance treatment with the dispersant, is dispersed in a solution of the resin in an alcoholic solvent; and a method in which the untreated pigment and the dispersant are mixed with the resin solution and the pigment is subjected to dispersion processing in a disperser.

When the method that the pigment, subsequent to its advance treatment with the dispersant, is dispersed in the solution of the resin in the alcoholic solvent is adopted, the treatment of the pigment can be practiced, for example, as will be described next. (1) Subsequent to dissolution of the pigment and the dispersant in sulfuric acid or the like, the resultant solution is poured into water. The thus-obtained mixture is alkalinized to have both of the pigment and dispersant precipitated as a solid solution. The solid solution is collected by filtration, washed with water, dried and then ground, whereby the pigment is obtained in a treated form. (2) The dispersant is converted into a salt with sulfuric acid, hydrochloric acid, acetic acid or the like. The salt is mixed with the pigment in water and, if necessary, the resultant mixture is subjected to dispersion processing in a disperser to have the dispersant adsorbed on pigment surfaces. The thus-treated pigment is caused to precipitate under alkaline condition, collected by filtration, washed with water, dried and then ground, whereby the pigment is obtained in the treated form. (3) The dispersant is dissolved in a liquid organic acid such as acetic acid, followed by the addition of the pigment. After the dispersant is allowed to be adsorbed on pigment surfaces with optional dispersing processing in a disperser, the thus-treated pigment is collected by filtration, washed with an alkaline solution, washed with water, dried and then ground, whereby the pigment is obtained in the treated form. The treated pigment obtained as described above is dispersed in the solution of the resin in an alcoholic solvent to produce the ink of the present invention.

When the method that the untreated pigment and the dispersant are mixed with the resin solution and the pigment is subjected to dispersion processing in a disperser is adopted, the pigment and the dispersant are added to the solution of the resin in the alcoholic solvent and subsequent to optional provisional agitation, the mixture is dispersed in a disperser to obtain an ink. No particular limitation is imposed on the disperser which can be used in the present invention. Examples can include a kneader, an attritor, a ball mill, a sand mill and a horizontal disperser with tumbling means contained therein, said sand mill and horizontal disperser making use of glass, zircon or the like, and a colloid mill. Upon using the dispersant-treated pigment, it is also possible to further disperse the dispersant-treated pigment in a solid resin to obtain pigment chips and then to dissolve the pigment chips in an alcoholic solvent to obtain an ink. Subsequent to the dissolution of the pigment chips, a resin may be added as needed.

Pigment chips can be obtained, for example, by one of the following methods: (1) A solid resin obtained by suspension polymerization or a solid resin collected from a resin solution obtained by solution polymerization and a dispersant-treated pigment are kneaded under heat by using a kneader, a Banbury mixer, a mixing roll, a three-roll mill or the like either singly or in combination such that the pigment is dispersed in the resin. The resultant pigment-dispersed resin is then ground or chopped to obtain chips. (2) A solution of a resin in a water-soluble solvent and a presscake of a dispersant-treated pigment are mixed in a kneader, followed by heating to the softening point of the resin or higher to remove water. If necessary, the pigment is dispersed by using a three-roll mill, an extruder or the like. The resultant pigment-dispersed resin is ground or chopped to obtain pigment chips. (3) A presscake of a dispersant-treated pigment and a solid resin are subjected to flushing at the softening temperature of the resin or higher.

In the ink according to the present invention, the above-described dispersant may be used generally in a proportion of from 0.5 to 50 parts by weight, preferably in a proportion of from 1 to 30 parts by weight per 100 parts by weight of the pigment. On the other hand, the pigment may be used generally in a proportion of from 5 to 500 parts by weight per 100 parts by weight of the resin.

The concentration of the pigment in the ink according to the present invention may be from 0.3 to 50 wt. % in general, with 0.5 to 30 wt. % being preferred, although it varies depending on the pigment. The viscosity of the ink may range generally from 1 to 50 mPa·s, preferably from 2 to 30 mPa·s. Depending on the construction of the writing instrument, a viscosity lower than 7 mPa·s may be required in some instances. It is particularly important for an ink to be equipped with excellent stability in viscosity along the passage of time. owing to the use of the above-described dispersant and resin along with a pigment, the ink according to the present invention has been imparted with excellent time-dependent stability in viscosity.

A variety of additives can also be added to the ink of the present invention. Illustrative of such additives are fastness improvers such as ultraviolet absorbers and antioxidants; anti-settling agents; release agents and releasability improvers; perfumes and antimicrobial agents; plasticizers; and drying inhibitors. If necessary, one or more dyes can be added further. As a resin, a resin which has compatibility with the resin for use in the present invention may also be used in combination to an extent not lowering the dispersion stability of the pigment.

In general, the thus-obtained ink can be used as is. It is however preferable to process the ink further in a centrifugal separator or an ultracentrifugal separator or through a filter, because removal of coarse particles of the pigment, which may exist in a trace amount in some instances, makes it possible to heighten the reliability of the writing instrument or recording apparatus.

The writing instrument according to the present invention can be obtained by filling the ink of this invention, which has been obtained as described above, in a casing equipped with a porous tip. No particular limitation is imposed on the casing insofar as it has a size and shape convenient for writing as in the case of a variety of conventional writing instruments fitted with porous tips. The material of the casing, including its cap, can be a metal, a plastic or a composite. material thereof insofar as it is practically free from solvent permeation.

No limitation is imposed on the structure or material of the porous tip insofar as it allows the ink to move from the interior of the casing to the free end of the tip as writing proceeds. However, excellent writing characteristics, durability and solvent resistance are required. Usable examples of fibers of bundled fiber tips and felt tips can include synthetic fibers such as polyester, polypropylene, nylon, polyacrylonitrile and vinylon fibers; cellulose and cellulose-derived regenerated fibers; and natural fibers such as wool, silk and cotton. Usable examples of open-cell foamed plastic products can include rigid or flexible urethane resin foams, foams of acetalized polyvinyl alcohol, and foamed of regenerated fibers. Usable examples of ink-occluding members can include bundles fibers, felted fibers, knitted fibers, and open-cell foamed plastic products.

In the above description, inks making use of the dispersants according to the present invention have been referred to as representative examples. The present invention is however not limited only to inks. For example, the dispersants according to the present invention are useful as dispersants for a variety of conventionally-known pigments, and are useful as dispersants for various pigments employed as coloring matters in diverse paints, printing inks, pigment printing agents, synthetic resins and the like.

The present invention will next be described more specifically by Examples and Comparative Examples, in which the designations of "part" or "parts" and "%" are all by weight.

EXAMPLE 1

Added to 600 parts of o-dichlorobenzene were 62 parts of 1-aminoanthraquinone and 25 parts of cyanuric chloride, followed by stirring at 130° C. for 5 hours. After cooling, 50 parts of N,N,N",N"-tetraethyl-diethylenetriamine were added further, and the resultant mixture was stirred at 170° C. for 3 hours. Subsequent to filtration, the thus-obtained filtercake was washed with ethanol and then dried, whereby the above-described specific example (1) was obtained as Dispersant 1.

EXAMPLE 2

In a similar manner as in Example 1, the above-described specific example (2) was obtained as Dispersant 2 by successively subjecting 1-aminoanthraquinone and 3,3'-iminobis(N,N-dimethylpropylamine) to condensation reactions with cyanuric chloride.

EXAMPLE 3

In a similar manner as in Example 1, the above-described specific example (3) was obtained as Dispersant 3 by successively subjecting 1-aminoanthraquinone and 3-ethyl-10-methyl-3,6,10-triazaundecane to condensation reactions with cyanuric chloride.

EXAMPLE 4

In a similar manner as in Example 1, the above-described specific example (4) was obtained as Dispersant 4 by successively subjecting 1-amino-5-benzoylaminoanthraquinone and 3,3'-iminobis(N,N-dimethylpropylamine) to condensation reactions with cyanuric chloride.

EXAMPLE 5

In a similar manner as in Example 1, the above-described specific example (5) was obtained as Dispersant 5 by successively subjecting 1-amino-5-benzoylaminoanthraquinone, aniline and 3,3'-imino-bis(N,N-dimethylpropylamine) to condensation reactions with cyanuric chloride.

EXAMPLE 6

In a similar manner as in Example 1, the above-described specific example (6) was obtained as Dispersant 6 by successively subjecting 1-aminoanthraquinone and 5,13-di(n-butyl)-5,9,13-triazaheptadecane to condensation reactions with cyanuric chloride.

EXAMPLE 7

In a similar manner as in Example 1, the above-described specific example (7) was obtained as Dispersant 7 by successively subjecting 1-aminoanthraquinone and 2,2'-dipicolylamine to condensation reactions with cyanuric chloride.

EXAMPLE 8

In a similar manner as in Example 1, the above-described specific example (8) was obtained as Dispersant 8 by successively subjecting 1-aminoanthraquinone and 3,3'-dipicolylamine to condensation reactions with cyanuric chloride.

EXAMPLE 9

In a similar manner as in Example 1, the above-described specific example (9) was obtained as Dispersant 9 by successively subjecting 1-amino-4-benzoylaminoanthraquinone and N,N",N"-tetraethyl-diethylenetriamine to condensation reactions with cyanuric chloride.

EXAMPLE 10

In a similar manner as in Example 1, the above-described specific example (10) was obtained as Dispersant 10 by successively subjecting 1-amino-4-benzoylaminoanthraquinone and 3,3'-iminobis(N,N-dimethylpropylamine) to condensation reactions with cyanuric chloride.

EXAMPLE 11

In a similar manner as in Example 1, the above-described specific example (11) was obtained as Dispersant 11 by successively subjecting 1-amino-4-benzoylaminoanthraquinone and 3-ethyl-10-methyl-3,6,10-triazaundecane to condensation reactions with cyanuric chloride.

EXAMPLE 12

In a similar manner as in Example 1, the above-described specific example (12) was obtained as Dispersant 12 by successively subjecting 1-amino-4,5-dibenzoylaminoanthraquinone and 3,3'-iminobis(N,N-dimethylpropylamine) to condensation reactions with cyanuric chloride.

EXAMPLE 13

In a similar manner as in Example 1, the above-described specific example (13) was obtained as Dispersant 13 by successively subjecting 1-amino-4-benzoylaminoanthraquinone, aniline and 3,3'-imino-bis(N,N-dimethylpropylamine) to condensation reactions with cyanuric chloride.

EXAMPLE 14

In a similar manner as in Example 1, the above-described specific example (14) was obtained as Dispersant 14 by successively subjecting 1-amino-4-benzoylaminoanthraquinone and 5,13-di(n-butyl)-5,9,13-triazaheptadecane to condensation reactions with cyanuric chloride.

EXAMPLE 15

In a similar manner as in Example 1, the above-described specific example (15) was obtained as Dispersant 15 by successively subjecting 1-amino-4-benzoylaminoanthraquinone and 2,2'-dipicolylamine to -condensation reactions with cyanuric chloride.

EXAMPLE 16

In a similar manner as in Example 1, the above-described specific example (16) was obtained as Dispersant 16 by successively subjecting 1-amino-4- benzoylaminoanthraquinone and 3,3'-dipicolylamine to condensation reactions with cyanuric chloride.

EXAMPLE 16-2

In a similar manner as in Example 1, the above-described specific example (17) was obtained as Dispersant 17 by successively subjecting 1-amino-4-hydroxyanthraquinone and 3,3'-iminobis(N,N-dimethyl-propylamine) to condensation reactions with cyanuric chloride.

EXAMPLE 16-3

In a similar manner as in Example 1, the above-described specific example (18) was obtained as Dispersant 18 by successively subjecting 1-amino-4-methoxyanthraquinone and 3,3'-iminobis(N,N-dimethyl-propylamine) to condensation reactions with cyanuric chloride.

EXAMPLE 16-4

In a similar manner as in Example 1, the above-described specific example (19) was obtained as Dispersant 19 by successively subjecting 1-amino-acridone-1,2(2',4'-dichloro)acridone and 3,3'-iminobis(N,N-dimethylpropylamine) to condensation reactions with cyanuric chloride.

Synthesis Example of Film-Forming Resin

Charged in a polymerizer were 75 parts of hydroxyethyl methacrylate, 25 parts of α-methylstyrene, 100 parts of methyl methacrylate, 75 parts of acryloyloxyethyl phthalate, 75 parts of lauryl methacrylate, 150 parts of diacetoneacrylamide, 15 parts of azobisisobutyronitrile, 550 parts of ethanol, 150 parts of methylcyclohexane and 50 parts of ethyl acetate. A cooling coil was set, followed by polymerization at 75° C. for 10 hours. After cooling, the resin solution was taken out of the polymerizer. It was provided as a resin solution. The resin content was 40%, and the viscosity was 250 mPa·s. The number average molecular weight of the resin was 8,600 as measured by GPC and converted with reference to the corresponding data of standard polystyrene, and the acid value of the resin was 39.

EXAMPLE 17

Dispersed in a horizontal disperser with tumbling medium contained therein were 250 parts of the above-described resin solution, 50 parts of benzidine yellow (P.Y. 83), 4 parts of Dispersant (1) of Example 1, 536 parts of ethanol, 60 parts of methylcyclohexane and 100 parts of ethoxypropanol. Coarse particles were then removed by ultracentrifugal separation, whereby an ink according to the present invention was obtained. The average particle size of the pigment was 95 nm, and the viscosity was 3.5 mPa·s. The ink was stored at 50° C. for a week, but settling of the pigment was not observed. When its viscosity was measured, it was still 3.5 mPa·s, thereby indicating no change in viscosity.

The ink was next filled in a pen casing equipped with a bundled fiber tip, and a writing test was conducted on a polyethylene film. Smooth writing was feasible. Further, 20 parts of ethoxypropanol and 5 parts of benzyl alcohol were added further to 100 parts of the ink. Using the thus-obtained ink, printing was performed by an ink-jet printer. Good printed matter was obtained.

EXAMPLES 18–24

Yellow inks were obtained in a similar manner as in Example 17 except that the dispersants of Examples 2–8 were used as dispersants, respectively. Those yellow inks were then ranked as in Example 17. The results are presented in Table 1 together with the results of Example 17. In the table, "A" indicates good in both writing characteristics and ink-jet printability, while "B" indicates insufficient writing characteristics or insufficient ink-jet printability.

Comparative Example 1

A yellow ink was obtained in a similar manner as in Example 17 except that the dispersant was not used. The ink was ranked as in Example 17. The results are also presented in Table 1.

TABLE 1

| | | Viscosity stability of ink | | Performance of ink | |
|---|---|---|---|---|---|
| | | Shortly | After | | |
| | Kind of dispersant | after formulation | stored for a week (50° C.) | Writing characteristics | Ink-jet printability |
| Example 17 | Dispersant 1 | 3.5 | 3.5 | A | A |
| Example 18 | Dispersant 2 | 3.9 | 4.0 | A | A |
| Example 19 | Dispersant 3 | 3.5 | 3.6 | A | A |
| Example 20 | Dispersant 4 | 3.6 | 3.6 | A | A |
| Example 21 | Dispersant 5 | 3.4 | 3.5 | A | A |
| Example 22 | Dispersant 6 | 3.7 | 3.7 | A | A |
| Example 23 | Dispersant 7 | 3.9 | 4.0 | A | A |
| Example 24 | Dispersant 8 | 4.0 | 4.1 | A | A |
| Comp. Ex. 1 | None | 62.1 | 89.3 | B | B |

EXAMPLE 25

Ten (10) parts of Dispersant 2 were dissolved in 100 parts of an aqueous solution which contained 5 parts of glacial acetic acid. The resultant solution was added to a slurry of a red pigment (P.R. 254; pigment content: 100 parts), followed by stirring for 60 minutes. A 10% aqueous solution of sodium hydroxide was then gradually added to adjust the pH of the system to 8.5. After the mixture was stirred for further 30 minutes, the resulting solid matter was collected by filtration, washed, dried at 90° C. and then ground, whereby 108 parts of red pigment powder surface-treated with the dispersant were obtained.

The thus-obtained surface-treated pigment was dispersed to a pigment content of 15% in a commercial melamine/alkyd paint by a ball mill. The colored paint so obtained had low viscosity, and showed fluidity substantially close to a Newtonian flow. Further, the red paint was mixed with a commercial white melamine/alkyd paint to formulate a pale red paint. Even after stored for a week, the pale red paint was still in a homogeneous form without any color separation.

Comparative Example 2

A paint was formulated in a similar manner as in Example 25 except that the red pigment (P.R. 254) was used without surface treatment with Dispersant 2. The paint was ranked as in Example 25. The paint had high viscosity, and in the form of a mixed paint with a white paint, the red pigment underwent separation and settling through coagulation.

EXAMPLE 26

Eight (8) parts of Dispersant 3 were dissolved in 100 parts of an aqueous solution which contained 5 parts of glacial acetic acid. The resultant solution was added to a slurry of a red pigment (P.R. 254; pigment content: 100 parts), followed by stirring for 60 minutes. A 10% aqueous solution of sodium hydroxide was then gradually added to adjust the pH of the system to 8.5. After the mixture was stirred for further 30 minutes, the resulting solid matter was collected by filtration, washed, dried at 90° C. and then ground, whereby 105 parts of red pigment powder surface-treated with the dispersant were obtained.

The thus-obtained pigment composition was dispersed in a commercial acrylic lacquer by a beads mill, whereby a red paint having a pigment content of 13% was formulated. The paint was adjusted in viscosity with a lacquer thinner and was spray-painted on an iron plate. A plate coated in a red color and having a dry film thickness of 32 $\mu$m was obtained. It was excellent in vividness, and showed a high degree of gloss.

Comparative Example 3

A paint was formulated in a similar manner as in Example 26 except that the red pigment (P.R. 254) was used without surface treatment with Dispersant 3. The viscosity was adjusted likewise, and the paint was ranked as in Example 26. The surface of a coating on a plate coated in a red color was not smooth, and its gloss was low.

EXAMPLE 27

Dispersed in a horizontal disperser with tumbling medium contained therein were 250 parts of the resin solution prepared in the Synthesis Example of the film-forming resin, 50 parts of cyanine blue (P.B. 15-2), 4 parts of Dispersant (9) of Example 9, 536 parts of ethanol, 60 parts of methylcyclohexane and 100 parts of ethoxypropanol. Coarse particles were then removed by ultracentrifugal separation, whereby an ink according to the present invention was obtained. The average particle size of the pigment was 95 nm, and the viscosity was 3.8 mPa·s. The ink was stored at 50° C. for a week, but settling of the pigment was not observed. When its viscosity was measured, it was still 3.8 mPa·s and accordingly, no change took place in viscosity.

The ink was next filled in a pen casing equipped with a bundled fiber tip, and a writing test was conducted on a polyethylene film. Smooth writing was feasible. Further, 20 parts of ethoxypropanol and 5 parts of benzyl alcohol were added further to 100 parts of the ink. Using the thus-obtained ink, printing was performed by an ink-jet printer. Good printed matter was obtained.

EXAMPLES 28–34

Blue inks were obtained in a similar manner as in Example 27 except that the dispersants of Examples 10–16 were used as dispersants, respectively. Those blue inks were then ranked as in Example 27. The results are presented in Table 2 together with the results of Example 27. In the table, "A" indicates good in both writing characteristics and ink-jet printability, while "B" indicates insufficient writing characteristics or insufficient ink-jet printability.

Comparative Example 4

A blue ink was obtained in a similar manner as in Example 28 except that the dispersant was not used. The ink was ranked as in Example 28. The results are also presented in Table 2.

TABLE 2

| | | Viscosity stability of ink | | Performance of ink | |
|---|---|---|---|---|---|
| | | Shortly | After | | |
| | Kind of dispersant | after formulation | stored for a week (50° C.) | Writing characteristics | Ink-jet printability |
| Example 27 | Dispersant 9 | 3.8 | 3.8 | A | A |
| Example 28 | Dispersant 10 | 4.3 | 4.3 | A | A |
| Example 29 | Dispersant 11 | 4.5 | 4.5 | A | A |
| Example 30 | Dispersant 12 | 5.0 | 5.0 | A | A |
| Example 31 | Dispersant 13 | 3.2 | 3.2 | A | A |
| Example 32 | Dispersant 14 | 4.1 | 4.1 | A | A |
| Example 33 | Dispersant 15 | 5.6 | 5.6 | A | A |
| Example 34 | Dispersant 16 | 5.8 | 5.8 | A | A |
| Comp. Ex. 4 | None | 52.2 | 95.0 | B | B |

EXAMPLE 35

Ten (10) parts of Dispersant 10 were dissolved in 100 parts of an aqueous solution which contained 5 parts of glacial acetic acid. The resultant solution was added to a slurry of a red pigment (P.R. 254; pigment content: 100 parts), followed by stirring for 60 minutes. A 10% aqueous solution of sodium hydroxide was then gradually added to adjust the pH of the system to 8.5. After the mixture was stirred for further 30 minutes, the resulting solid matter was collected by filtration, washed, dried at 90° C. and then ground, whereby 108 parts of red pigment powder surface-treated with the dispersant were obtained.

The thus-obtained surface-treated pigment was dispersed to a pigment content of 15% in a commercial melamine/alkyd paint by a ball mill. The colored paint so obtained had low viscosity, and showed fluidity substantially close to a Newtonian flow. Further, the red paint was mixed with a commercial white melamine/alkyd paint to formulate a pale red paint. Even after stored for a week, the pale red paint was still in a homogeneous form without any color separation.

Comparative Example 5

A paint was formulated in a similar manner as in Example 35 except that the red pigment (P.R. 254) was used without surface treatment with Dispersant 10. The paint was ranked as in Example 35. The paint had high viscosity, and in the form of a mixed paint with a white paint, the red pigment underwent separation and settling through coagulation.

EXAMPLE 36

Eight (8) parts of Dispersant 11 were dissolved in 100 parts of an aqueous solution which contained 5 parts of glacial acetic acid. The resultant solution was added to a slurry of a red pigment (P.R. 254; pigment content: 100 parts), followed by stirring for 60 minutes. A 10% aqueous solution of sodium hydroxide was then gradually added to adjust the pH of the system to 8.5. After the mixture was stirred for further 30 minutes, the resulting solid matter was collected by filtration, washed, dried at 90° C. and then ground, whereby 105 parts of red pigment powder surface-treated with the dispersant were obtained.

The thus-obtained surface-treated pigment was dispersed in a commercial acrylic lacquer by a beads mill, whereby a red paint having a pigment content of 13% was formulated. The paint was adjusted in viscosity with a lacquer thinner and was spray-painted on an iron plate. A plate coated in a red color and having a dry film thickness of 32 μm was obtained. It was excellent in vividness, and showed a high degree of gloss.

Comparative Example 6

A paint was formulated in a similar manner as in Example 36 except that the red pigment (P.R. 254) was used without surface treatment with Dispersant 11. The viscosity was adjusted likewise, and the paint was ranked as in Example 36. The surface of a coating on a plate coated in a red color was not smooth, and its gloss was low.

EXAMPLE 37

Dispersed in a horizontal disperser with tumbling medium contained therein were 250 parts of the resin solution prepared in the Synthesis Example of the film-forming resin, 750 parts of C.I. pigment black, 4 parts of Dispersant (1) of Example 1, 536 parts of ethanol, 60 parts of methylcyclohexane and 100 parts of ethoxypropanol. Coarse particles were then removed by ultracentrifugal separation, whereby a black ink according to the present invention was obtained. The average particle size of the CB pigment was 95 nm, and the viscosity was 3.5 mPa·s. The black ink was stored at 50° C. for a week, but settling of the CB pigment was not observed. When its viscosity was measured, it was still 3.5 mPa·s and accordingly, no change took place in viscosity.

The black ink was next filled in a pen casing equipped with a bundled fiber tip, and a writing test was conducted on a polyethylene film. Smooth writing was feasible. Further, 20 parts of ethoxypropanol and 5 parts of benzyl alcohol were added further to 100 parts of the black ink. Using the thus-obtained black ink, printing was performed by an ink-jet printer. Good printed matter was obtained.

EXAMPLES 38–44

Black inks were obtained in a similar manner as in Example 37 except that the dispersants of Examples 2–8 were used as dispersants, respectively. Those black inks were then ranked as in Example 37. The results are presented in Table 3 together with the results of Example 37. In the table, "A" indicates good in both writing characteristics and ink-jet printability, while "B" indicates insufficient writing characteristics or insufficient ink-jet printability.

Comparative Example 7

A black ink was obtained in a similar manner as in Example 37 except that the dispersant was not used. The ink was ranked as in Example 37. The results are also presented in Table 3.

TABLE 3

| | | Viscosity stability of ink | | Performance of ink | |
| --- | --- | --- | --- | --- | --- |
| | | Shortly | After | | |
| | Kind of dispersant | after formulation | stored for a week (50° C.) | Writing characteristics | Ink-jet printability |
| Example 37 | Dispersant 1 | 3.5 | 3.5 | A | A |
| Example 38 | Dispersant 2 | 3.9 | 3.9 | A | A |
| Example 39 | Dispersant 3 | 3.8 | 3.9 | A | A |
| Example 40 | Dispersant 4 | 4.4 | 4.5 | A | A |
| Example 41 | Dispersant 5 | 4.1 | 4.1 | A | A |
| Example 42 | Dispersant 6 | 4.3 | 4.4 | A | A |

TABLE 3-continued

| | | Viscosity stability of ink | | Performance of ink | |
| --- | --- | --- | --- | --- | --- |
| | | Shortly | After | | |
| | Kind of dispersant | after formulation | stored for a week (50° C.) | Writing characteristics | Ink-jet printability |
| Example 43 | Dispersant 7 | 3.9 | 3.9 | A | A |
| Example 44 | Dispersant 8 | 4.0 | 4.0 | A | A |
| Comp. Ex. 7 | None | 63.5 | 89.0 | B | B |

EXAMPLE 45

Ten (10) parts of Dispersant 2 were dissolved in 200 parts of an aqueous solution which contained 5 parts of glacial acetic acid. The resultant solution was added to a slurry of C.I. pigment black 7 (CB pigment content: 100 parts), followed by stirring for 60 minutes. A 10% aqueous solution of sodium hydroxide was then gradually added to adjust the pH of the system to 8.5. After the mixture was stirred for further 30 minutes, the resulting solid matter was collected by filtration, washed, dried at 90° C. and then ground, whereby 108 parts of black pigment powder surface-treated with the dispersant were obtained.

The thus-obtained surface-treated CB pigment was dispersed to a CB pigment content of 15% in a commercial melamine/alkyd paint by a ball mill. The colored paint so obtained had low viscosity, and showed fluidity substantially close to a Newtonian flow. Further, the black paint was mixed with a commercial white melamine/alkyd paint to formulate a gray paint. Even after stored for a week, the gray paint was still in a homogeneous form without any color separation.

Comparative Example 8

A paint was formulated in a similar manner as in Example 45 except that the same CB pigment was used without surface treatment with Dispersant 2. The paint was ranked as in Example 45. The paint had high viscosity, and in the form of a mixed paint with a white paint, the CB pigment underwent separation and settling through coagulation.

EXAMPLE 46

Eight (8) parts of Dispersant 3 were dissolved in 100 parts of an aqueous solution which contained 5 parts of glacial acetic acid. The resultant solution was added to a slurry of C.I. pigment black 7 (CB pigment content: 100 parts), followed by stirring for 60 minutes. A 10% aqueous solution of sodium hydroxide was then gradually added to adjust the pH of the system to 8.5. After the mixture was stirred for further 30 minutes, the resulting solid matter was collected by filtration, washed, dried at 90° C. and then ground, whereby 105 parts of black pigment powder surface-treated with the dispersant were obtained.

The thus-obtained surface-treated CB pigment was dispersed in a commercial acrylic lacquer by a beads mill, whereby a black paint having a CB pigment content of 13% was formulated. The paint was adjusted in viscosity with a lacquer thinner and was spray-painted on an iron plate. A plate coated in a black color and having a dry film thickness of 32 μm was obtained. It was excellent in vividness, and showed a high degree of gloss.

Comparative Example 9

A paint was formulated in a similar manner as in Example 46 except that the same CB pigment was used without surface treatment with Dispersant 3. The viscosity was adjusted likewise, and the paint was ranked as in Example 46. The surface of a coating on a plate coated in a black color was not smooth, and its gloss was low.

EXAMPLE 47

Dispersed in a horizontal disperser with tumbling medium contained therein were 250 parts of the resin solution prepared in the Synthesis Example of the film-forming resin, 750 parts of C.I. pigment black, 4 parts of Dispersant (9) of Example 9, 536 parts of ethanol, 60 parts of methylcyclohexane and 100 parts of ethoxypropanol. Coarse particles were then removed by ultracentrifugal separation, whereby a black ink according to the present invention was obtained. The average particle size of the CB pigment was 95 nm, and the viscosity was 3.5 mPa·s. The black ink was stored at 50° C. for a week, but settling of the CB pigment was not observed. When its viscosity was measured, it was still 3.5 mPa·s and accordingly, no change took place in viscosity.

The black ink was next filled in a pen casing equipped with a bundled fiber tip, and a writing test was conducted on a polyethylene film. Smooth writing was feasible. Further, 20 parts of ethoxypropanol and 5 parts of benzyl alcohol were added further to 100 parts of the black ink. Using the thus-obtained black ink, printing was performed by an ink-jet printer. Good printed matter was obtained.

EXAMPLES 48–54

Black inks were obtained in a similar manner as in Example 47 except that the dispersants of Examples 10–16 were used as dispersants, respectively. Those black inks were then ranked as in Example 47. The results are presented in Table 4 together with the results of Example 47. In the table, "A" indicates good in both writing characteristics and ink-jet printability, while "B" indicates insufficient writing characteristics or insufficient ink-jet printability.

TABLE 4

|  |  | Viscosity stability of ink | | Performance of ink | |
|---|---|---|---|---|---|
|  | Kind of dispersant | Shortly after formulation | After stored for a week (50° C.) | Writing characteristics | Ink-jet printability |
| Example 47 | Dispersant 9 | 3.5 | 3.5 | A | A |
| Example 48 | Dispersant 10 | 3.9 | 3.9 | A | A |
| Example 49 | Dispersant 11 | 3.7 | 3.7 | A | A |
| Example 50 | Dispersant 12 | 3.8 | 3.8 | A | A |
| Example 51 | Dispersant 13 | 3.5 | 3.6 | A | A |
| Example 52 | Dispersant 14 | 3.8 | 3.8 | A | A |
| Example 53 | Dispersant 15 | 3.8 | 3.8 | A | A |
| Example 54 | Dispersant 16 | 3.7 | 3.8 | A | A |
| Comp. Ex. 7 | None | 63.5 | 89.0 | B | B |

EXAMPLE 55

Ten (10) parts of Dispersant 10 were dissolved in 200 parts of an aqueous solution which contained 5 parts of glacial acetic acid. The resultant solution was added to a slurry of C.I. pigment black 7 (CB pigment content: 100 parts), followed by stirring for 60 minutes. A 10% aqueous solution of sodium hydroxide was then gradually added to adjust the pH of the system to 8.5. After the mixture was stirred for further 30 minutes, the resulting solid matter was collected by filtration, washed, dried at 90° C. and then ground, whereby 108 parts of black pigment powder surface-treated with the dispersant were obtained.

The thus-obtained surface-treated CB pigment was dispersed to a CB pigment content of 15% in a commercial melamine/alkyd paint by a ball mill. The colored paint so obtained had low viscosity, and showed fluidity substantially close to a Newtonian flow. Further, the black paint was mixed with a commercial white melamine/alkyd paint to formulate a gray paint. Even after stored for a week, the gray paint was still in a homogeneous form without any color separation.

Comparative Example 11

A paint was formulated in a similar manner as in Example 55 except that the same CB pigment was used without surface treatment with Dispersant 10. The paint was ranked as in Example 55. The paint had high viscosity, and in the form of a mixed paint with a white paint, the CB pigment underwent separation and settling through coagulation.

EXAMPLE 56

Eight (8) parts of Dispersant 11 were dissolved in 100 parts of an aqueous solution which contained 5 parts of glacial acetic acid. The resultant solution was added to a slurry of C.I. pigment black 7 (CB pigment content: 100 parts), followed by stirring for 60 minutes. A 10% aqueous solution of sodium hydroxide was then gradually added to adjust the pH of the system to 8.5. After the mixture was stirred for further 30 minutes, the resulting solid matter was collected by filtration, washed, dried at 90° C. and then ground, whereby 105 parts of black pigment powder surface-treated with the dispersant were obtained.

The thus-obtained surface-treated CB pigment was dispersed in a commercial acrylic lacquer by a beads mill, whereby a black paint having a CB pigment content of 13% was formulated. The paint was adjusted in viscosity with a lacquer thinner and was spray-painted on an iron plate. A plate coated in a black color and having a dry film thickness of 32 μm was obtained. It was excellent in vividness, and showed a high degree of gloss.

Comparative Example 12

A paint was formulated in a similar manner as in Example 56 except that the same CB pigment was used without surface treatment with Dispersant 11. The viscosity was adjusted likewise, and the paint was ranked as in Example 56. The surface of a coating on a plate coated in a black color was not smooth, and its gloss was low.

This application claims the priority of Japanese Patent Application No. HEI 10-371915 filed Dec. 28, 1998, which is incorporated herein by reference.

What is claimed is:

1. A dispersant for organic pigments, comprising a compound represented by the following formula (I):

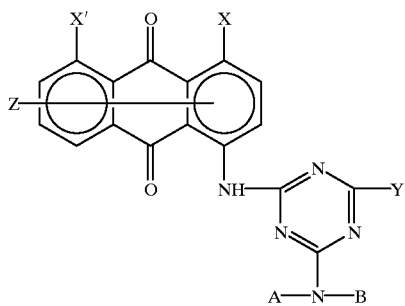

(I)

wherein X and X' each independently represent a hydrogen atom, a hydroxyl group, an alkoxy group, a primary, secondary or tertiary amino group, or an acylamino group; Y represents an anthraquinonylamino, phenylamino or phenoxy group, wherein said phenylamino and phenoxy have a hydrogen atom, a hydroxyl group, an alkoxy group, a primary, secondary or tertiary amino group, or an acylamino group at the 4-position or 5-position thereof; A and B each independently represent an alkyl group, a cycloalkyl group or an aryl group, and at least one of A and B has at least one substituent group containing a basic nitrogen atom; and Z represents a hydrogen atom, a cyano group, a halogen atom, an alkyl group, an alkoxy group, a nitro group, a benzoylamino group or a 3-benzoyl group, and said 3-benzoyl group may be fused together with X to form an acridone ring.

2. A dispersant according to claim 1, wherein said at least one substituent group containing said basic nitrogen atom is a primary, secondary or tertiary amino group, a quaternary ammonium group or a pyridinium group; and, when two or more substituent groups each of which contains said basic nitrogen group exist, said two or more substituent groups may be the same or different.

3. A dispersant according to claim 1, wherein said compound represented by the formula (I) is represented by the following formula (1):

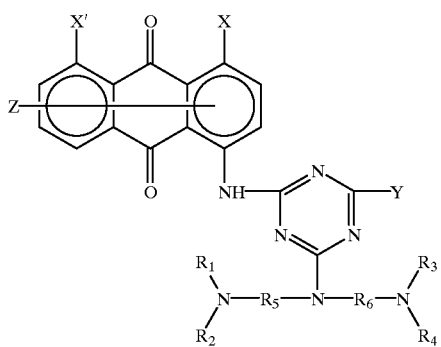

(1)

wherein X, X', Y and Z have the same meanings as defined above; $R_1$ to $R_4$ may be the same or different and each independently represent a substituted or unsubstituted alkyl or cycloalkyl group, and $R_1$ and $R_2$ and/or $R_3$ and $R_4$ may be fused together with the adjacent nitrogen atom thereof to form a heterocyclic ring which may additionally contain a further nitrogen atom, an oxygen atom or a sulfur atom; and $R_5$ and $R_6$ each independently represent an alkylene group, a cycloalkylene group or an arylene group.

4. A dispersant according to claim 1, wherein said compound represented by the formula (I) is represented by the following formula (2):

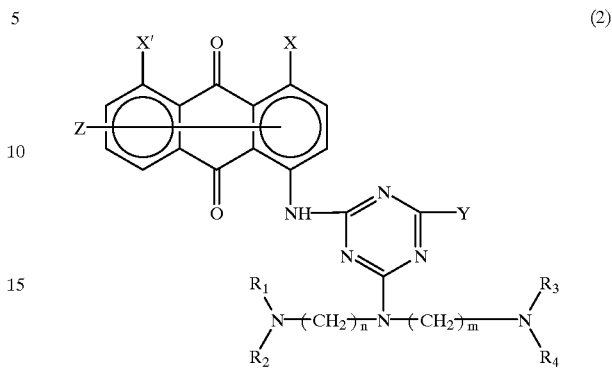

(2)

wherein X, X', Y and Z have the same meanings as defined above; $R_1$ to $R_4$ may be the same or different and each independently represent a substituted or unsubstituted alkyl or cycloalkyl group, and $R_1$ and $R_2$ and/or $R_3$ and $R_4$ may be fused together with the adjacent nitrogen atom thereof to form a heterocyclic ring which may additionally contain a further nitrogen atom, an oxygen atom or a sulfur atom; and n and m each independently stand for an integer of from 2 to 30.

5. A dispersant according to claim 1, wherein said compound represented by the formula (I) is represented by the following formula (3):

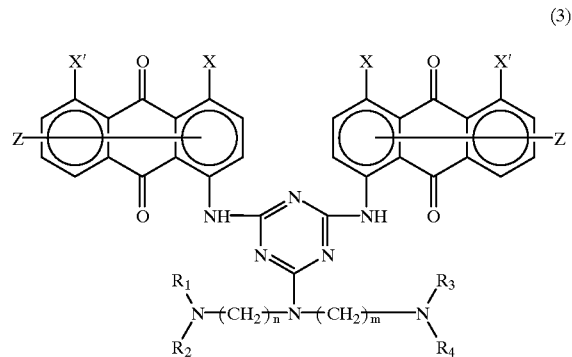

(3)

wherein X and X' each independently represent a hydrogen atom or a benzoylamino group; Z represents a hydrogen atom; $R_1$ to $R_4$ may be the same or different and each independently represent a methyl group or an ethyl group; and n and m each independently stand for 2 or 3.

6. A pigment dispersion comprising an organic pigment, a dispersant, a film-forming resin and an organic solvent, wherein said dispersant is a dispersant as defined in any one of claims 1–5.

7. A pigment dispersion according to claim 6, wherein said organic solvent is an alcoholic solvent.

8. A pigment dispersion according to claim 7, wherein said alcoholic solvent is a solvent which comprises an alcohol having a boiling point not higher than 150° C.

9. A pigment dispersion according to claim 6, wherein said film-forming resin is soluble in said alcoholic solvent.

10. A pigment dispersion according to claim 9, wherein said film-forming resin comprises 1 to 50 wt. % of a monoester of a hydroxyalkyl (meth)acrylate and a dibasic acid as monomer units, and the monoester is represented by the following formula:

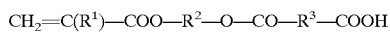

wherein $R^1$ represents a hydrogen atom or a methyl group; $R^2$ represents a $C_{2-6}$ alkylene group which may contain one or more branch chains; and $R^3$ represents an alkylene, cycloalkylene or arylene group which may contain one or more branched chains or unsaturated groups.

11. A pigment dispersion according to claim 10, wherein said film-forming resin has a number average molecular weight of from 2,000 to 100,000 as measured by GPC and converted based on a number average molecular weight of a standard polystyrene, and also has an acid value of from 0.5 to 300 mgKOH/g.

12. A pigment dispersion according to claim 6, wherein said organic pigment is a red pigment, a green pigment, a blue pigment, a yellow pigment, a purple pigment, or a black pigment.

13. A writing or recording pigment ink comprising a pigment dispersion as defined in claim 6.

14. A writing or recording pigment ink according to claim 13, wherein said dispersant is used in a proportion of from 0.5 to 50 parts by weight per 100 parts by weight of said pigment, said pigment is used in a proportion of from 5 to 500 parts by weight per 100 parts by weight of said resin, said pigment is contained at a concentration of from 0.3 to 50 wt % in said ink, and said ink has a viscosity of from 1 to 50 mPa·s.

15. A writing instrument or recording apparatus comprising a writing or recording pigment ink as defined in claim 14.

* * * * *